US012666285B2

(12) United States Patent
Wang

(10) Patent No.: US 12,666,285 B2
(45) Date of Patent: Jun. 23, 2026

(54) MEASUREMENT METHOD AND APPARATUS, TERMINAL DEVICE AND NETWORK DEVICE

(71) Applicant: GUANGDONG OPPO MOBILE TELECOMMUNICATIONS CORP., LTD., Dongguan (CN)

(72) Inventor: Shukun Wang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 880 days.

(21) Appl. No.: 17/987,055

(22) Filed: Nov. 15, 2022

(65) Prior Publication Data

US 2023/0080009 A1 Mar. 16, 2023

Related U.S. Application Data

(63) Continuation of application No. PCT/CN2020/091084, filed on May 19, 2020.

(51) Int. Cl.
*H04W 24/08* (2009.01)

(52) U.S. Cl.
CPC .................................. *H04W 24/08* (2013.01)

(58) Field of Classification Search
CPC ..... H04W 24/08; H04W 76/40; H04W 24/10; H04W 76/27; H04L 5/0053; H04L 5/001; H04L 5/0091; Y02D 30/70
See application file for complete search history.

(56) References Cited

U.S. PATENT DOCUMENTS 10,531,326 B2 1/2020 Hong
10,785,668 B2 9/2020 Kim
(Continued)

FOREIGN PATENT DOCUMENTS

CN 106332174 A 1/2017
CN 109309969 A 2/2019
(Continued)

OTHER PUBLICATIONS

Third Office Action of the Chinese application No. 202080099744. 7, issued on Mar. 13, 2025. 29 pages with English translation.
(Continued)

*Primary Examiner* — Sujoy K Kundu
*Assistant Examiner* — Raul Rivas
(74) *Attorney, Agent, or Firm* — PERKINS COIE LLP

(57) ABSTRACT

A measurement method, comprising: the terminal device receiving a first measurement configuration sent by a first network device, wherein the first measurement configuration is a measurement configuration for an idle state or an inactive state; performing, on the basis of the first measurement configuration, measurement in the idle state or the inactive state; and reporting a measurement result to the first network device or a second network device after entering a connected state, wherein the first measurement configuration carries first indication information and/or second indication information, the first indication information being used for indicating a cell that does not need to be measured by the terminal device and/or a cell that does not need to report a measurement result, and the second indication information being used for indicating a cell that needs to be measured by the terminal device and/or a cell that needs to report a measurement result.

20 Claims, 9 Drawing Sheets

Receiving, by a terminal device, a first measurement configuration from a first network device, the first measurement configuration being a measurement configuration for an idle state or an inactive state, the first measurement configuration carrying at least one of first indication information or second indication information, the first indication information being used for indicating at least one of a cell on which the terminal device does not need to perform a measurement or a cell of which the terminal device does not need to report a measurement result, and the second indication information being used for indicating at least one of a cell on which the terminal device needs to perform a measurement or a cell of which the terminal device needs to report a measurement result 301

Performing, by the terminal device, a measurement based on the first measurement configuration in the idle state or the inactive state, and reporting, by the terminal device, a measurement result to the first network device or a second network device after the terminal device enters a connected state 302

(56) References Cited

U.S. PATENT DOCUMENTS

| | | | |
|---|---|---|---|
| 2018/0220344 A1 | 8/2018 | Shaheen | |
| 2018/0368018 A1 | 12/2018 | Kim et al. | |
| 2019/0037425 A1 | 1/2019 | Hong et al. | |
| 2022/0167290 A1* | 5/2022 | Harada | H04L 5/0048 |

FOREIGN PATENT DOCUMENTS

| | | | | |
|---|---|---|---|---|
| CN | 110351762 A | | 10/2019 | |
| CN | 110392991 A | | 10/2019 | |
| CN | 110650492 A | | 1/2020 | |
| CN | 110731097 A | | 1/2020 | |
| CN | 110913422 A | | 3/2020 | |
| CN | 110972289 A | | 4/2020 | |
| CN | 111726824 B | * | 6/2022 | H04W 24/02 |
| CN | 109309969 B | * | 7/2022 | H04W 72/23 |
| EP | 2744268 B1 | * | 2/2019 | H04W 36/324 |
| WO | 2018144523 A1 | | 8/2018 | |
| WO | 2020057518 A1 | | 3/2020 | |

OTHER PUBLICATIONS

Huawei, HiSilicon, "Usage of SI and dedicated signalling for early measurement configuration", 3GPP TSG-RAN WG2#106 R2-1907477, Reno, USA, May 13-17, 2019, pp. 1-3.

Orange et al., "Introduction of a second SMTC per frequency carrier in idle/inactive", 3GPP TSG-RAN WG2 Meeting # 107-Bis R2-1913258 (Revision of R2-1910673), Chongqing , China, Oct. 14-Oct. 18, 2019, pp. 1-7.

Ericsson, "[AT109bis-e][032][DCCA] RRC (Ericsson)", 3GPP TSG-RAN WG2 #109bis-e R2-2004120, Electronic Meeting, Apr. 20-30, 2020, pp. 7-9.

Second Office Action of the Chinese application No. 202080099744. 7, issued on Nov. 7, 2024. 24 pages with English translation.

International Search Report in the international application No. PCT/CN2020/091084, mailed on Jan. 27, 2021.

Written Opinion of the International Search Authority in the international application No. PCT/CN2020/091084, mailed on Jan. 27, 2021.

Ericsson, "Remaining issues for early measurement results and configurations", 3GPP TSG-RAN WG2 #108 R2-1915284, Reno, USA, Nov. 18-22, 2019, pp. 1-5.

First Office Action of the Chinese application No. 202080099744.7, issued on Aug. 5, 2024. 23 pages with English translation.

* cited by examiner

100

110

120

120

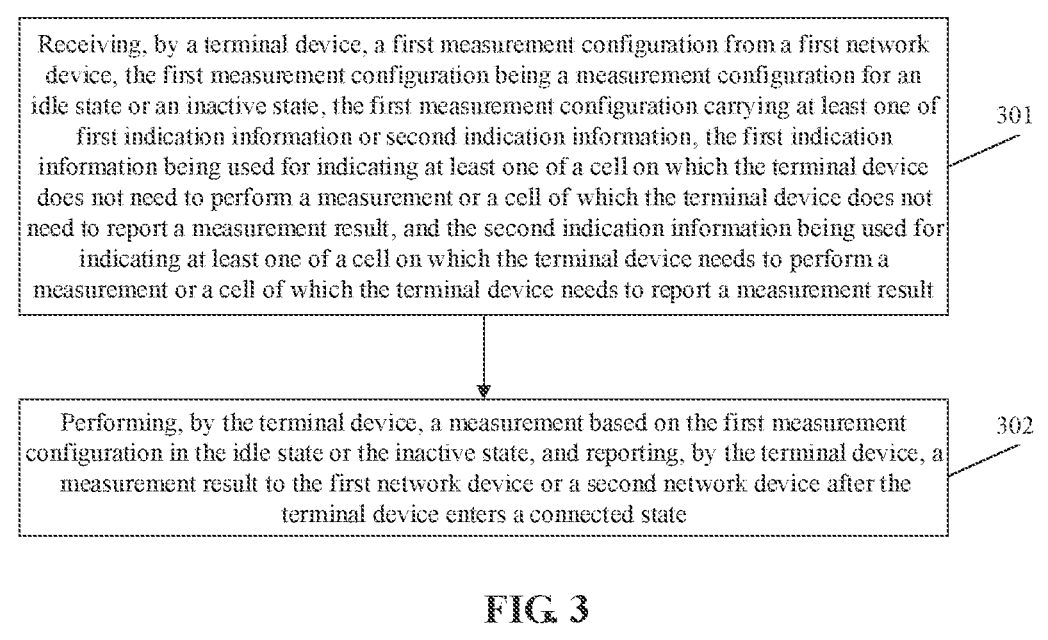

Receiving, by a terminal device, a first measurement configuration from a first network device, the first measurement configuration being a measurement configuration for an idle state or an inactive state, the first measurement configuration carrying at least one of first indication information or second indication information, the first indication information being used for indicating at least one of a cell on which the terminal device does not need to perform a measurement or a cell of which the terminal device does not need to report a measurement result, and the second indication information being used for indicating at least one of a cell on which the terminal device needs to perform a measurement or a cell of which the terminal device needs to report a measurement result          301

Performing, by the terminal device, a measurement based on the first measurement configuration in the idle state or the inactive state, and reporting, by the terminal device, a measurement result to the first network device or a second network device after the terminal device enters a connected state          302

FIG. 3

Measurement apparatus

Sending unit 501

FIG. 5

MEASUREMENT METHOD AND APPARATUS, TERMINAL DEVICE AND NETWORK DEVICE

CROSS-REFERENCE TO RELATED APPLICATION

This is a continuation application of International Patent Application No. PCT/CN2020/091084, filed on May 19, 2020, entitled "MEASUREMENT METHOD AND APPARATUS, TERMINAL DEVICE AND NETWORK DEVICE", the disclosure of which is hereby incorporated by reference in its entirety.

BACKGROUND

In order to quickly configure or establish a secondary cell (SCell)/secondary cell group (SCG), the terminal device can be required to perform a measurement in an idle state or an inactive state, and report the measurement result to the network side after the terminal device enters the connected state, so that the network side can quickly configure or establish the SCell/SCG according to the measurement result reported by the terminal device. This type of measurement is called early measurement. For the measurement configuration of early measurement, how to avoid performing a measurement on a sleeper cell by the terminal device is a problem that needs to be solved.

SUMMARY

The embodiments of the application relate to the field of mobile communication technology, in particular to a measurement method and apparatus, a terminal device and a network device. In embodiments of the present disclosure, there is provided a measurement method and apparatus, a terminal device and a network device.

The measurement method provided by the embodiment of the present disclosure includes that:

a terminal device receives a first measurement configuration from a first network device, the first measurement configuration being a measurement configuration for an idle state or an inactive state; and the terminal device performs a measurement based on the first measurement configuration in the idle state or the inactive state, and reports a measurement result to the first network device or a second network device after the terminal device enters a connected state.

The first measurement configuration carries at least one of first indication information or second indication information, the first indication information being used for indicating at least one of a cell on which the terminal device does not need to perform a measurement or a cell of which the terminal device does not need to report a measurement result, and the second indication information being used for indicating at least one of a cell on which the terminal device needs to perform a measurement or a cell of which the terminal device needs to report a measurement result.

The measurement method provided by the embodiment of the present disclosure includes that:

a first network device sends a first measurement configuration to a terminal device, the first measurement configuration being a measurement configuration for an idle state or an inactive state. The first measurement configuration carries at least one of first indication information or second indication information, the first indication information being used for indicating at least one of a cell on which the terminal device does not need to perform a measurement or a cell of which the terminal device does not need to report a measurement result, and the second indication information being used for indicating at least one of a cell on which the terminal device needs to perform a measurement or a cell of which the terminal device needs to report a measurement result.

The first measurement configuration is used for the terminal device to perform a measurement in the idle state or the inactive state and report a measurement result to the first network device or a second network device after the terminal device enters a connected state.

The measurement apparatus provided by the embodiment of the present disclosure, applied to a terminal device and including a receiving unit and a measurement unit.

The receiving unit is configured to receive a first measurement configuration from a first network device, the first measurement configuration being a measurement configuration for an idle state or an inactive state. The first measurement configuration carries at least one of first indication information or second indication information, the first indication information being used for indicating at least one of a cell on which the terminal device does not need to perform a measurement or a cell of which the terminal device does not need to report a measurement result, and the second indication information being used for indicating at least one of a cell on which the terminal device needs to perform a measurement or a cell of which the terminal device needs to report a measurement result.

The measurement unit is configured to perform a measurement based on the first measurement configuration in the idle state or the inactive state, and report a measurement result to the first network device or a second network device after the terminal device enters a connected state.

The measurement apparatus provided by the embodiment of the present disclosure, applied to a first network device and including a sending unit.

The sending unit is configured to send a first measurement configuration to a terminal device, the first measurement configuration being a measurement configuration for an idle state or an inactive state. The first measurement configuration carries at least one of first indication information or second indication information, the first indication information being used for indicating at least one of a cell on which the terminal device does not need to perform a measurement or a cell of which the terminal device does not need to report a measurement result, and the second indication information being used for indicating at least one of a cell on which the terminal device needs to perform a measurement or a cell of which the terminal device needs to report a measurement result.

The first measurement configuration is used for the terminal device to perform a measurement in the idle state or the inactive state and report a measurement result to the first network device or a second network device after the terminal device enters a connected state.

A terminal device provided by the embodiment of the present disclosure includes a processor and a memory. The memory is configured to store a computer program, and the processor is configured to call and run the computer program stored in the memory to execute the above measurement method.

A network device provided by the embodiment of the present disclosure includes a processor and a memory. The memory is configured to store a computer program, and the processor is configured to call and run the computer program stored in the memory to execute the above measurement method.

A chip provided by the embodiment of the present disclosure is used for implementing the above measurement method.

Specifically, the chip includes a processor, which is configured to call and run a computer program in a memory to cause a device equipped with the chip to execute the above measurement method.

A computer-readable storage medium provided by the embodiment of the present disclosure is configured to store a computer program that causes a computer to execute the above measurement method.

A computer program product provided by the embodiment of the present disclosure includes computer program instructions that cause a computer to execute the above measurement method.

A computer program provided by the embodiment of the present disclosure, when running on a computer, causes a computer to execute the above measurement method.

BRIEF DESCRIPTION OF THE DRAWINGS

The accompanying drawings illustrated herein are used to provide further understanding of the disclosure and constitute a part of the disclosure, and illustrative embodiments of the disclosure and their description are used to explain the disclosure instead of constituting improper limitation to the disclosure. In the accompanying drawings:

FIG. 3 is a flow diagram of a measurement method provided by an embodiment of the present disclosure.

FIG. 5 is a schematic diagram of a second structural composition of a measurement apparatus provided by the embodiment of the present disclosure.

DETAILED DESCRIPTION

The technical solution of the embodiments of the present disclosure will be described below in conjunction with the drawings in the embodiments of the present disclosure, and it is apparent that the described embodiments are part of the embodiments of the present disclosure, but not all of them. Based on the embodiments in the present disclosure, all other embodiments obtained by those skilled in the art without making creative efforts fall within the scope of protection of the present disclosure.

The technical solution of the embodiments of the present disclosure can be applied to various communication systems, such as long term evolution (LTE) system, LTE frequency division duplex (FDD) system, LTE time division duplex (TDD) system, 5G communication system or future communication system, etc.

Figure 1:
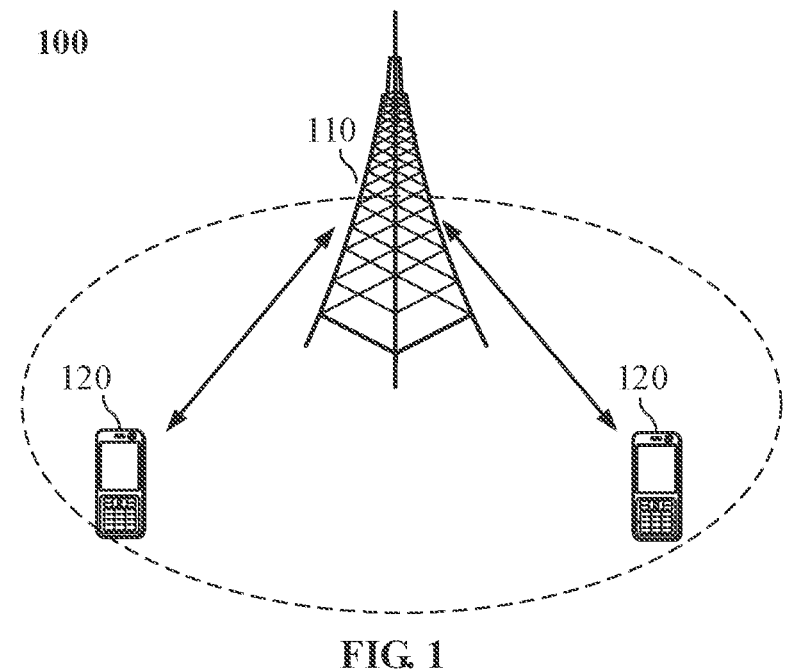
FIG. 1 is a schematic diagram of a communication system architecture provided by an embodiment of the present disclosure.

Exemplary, the communication system 100 applied in the embodiments of the present disclosure is illustrated in FIG. 1. The communication system 100 may include a network device 110, which may be a device that communicates with a terminal 120 (or referred to as a communication terminal or terminal device). The network device 110 can provide communication coverage for a particular geographic area and can communicate with terminal located within the coverage area. Alternatively, the network device 110 may be an evolution NodeB (eNB or eNodeB) in an LTE system, or a wireless controller in a cloud radio access network (CRAN), or the network device can be a mobile switching center, relay station, access point, in-vehicle device, wearable device, hub, switch, bridge, router, a network side device in a 5G network or a network device in a future communication system, etc.

The communication system 100 also includes at least one terminal 120 located within the coverage area of the network device 110. "Terminal" as used herein includes, but is not limited to, a connection via a wireline, such as via a public switched telephone network (PSTN), a digital subscriber line (DSL), a digital cable, a direct cable connection; and/or another data connection/network; and/or via a wireless interface such as a cellular network, a wireless local area network (WLAN), a digital television network such as a DVB-H network, a satellite network, an AM-FM broadcast transmitter; and/or a device of another terminal arranged to receive/transmit a communication signal; and/or internet of things (IoT) devices. A terminal arranged to communicate through a wireless interface may be referred to as "a wireless communication terminal", "a wireless terminal", or "a mobile terminal". Examples of mobile terminals include but are not limited to satellite or cellular phones; personal communications system (PCS) terminals that can combine cellular radio telephones with data processing, facsimile, and data communication capabilities; PDA which may include radio telephones, pagers, Internet/Intranet access, Web browsers, notebooks, calendars, and/or global positioning system (GPS) receivers; and conventional laptop and/or handheld receivers or other electronic devices including radio telephone transceivers. The terminal may refer to an access terminal, a user equipment (UE), a subscriber unit, a subscriber station, a mobile station, a remote station, a remote terminal, a mobile device, a user terminal, a terminal, a wireless communication device, a user agent, or a user device. The access terminal may be a cellular phone, a cordless phone, a session initiation protocol (SIP) telephone, wireless local loop (WLL) station, personal digital assistant (PDA), handheld device with wireless communication function, computing device or other processing device connected to wireless modem, in-vehicle device, wearable device, terminal in 5G network or terminal in future evolved PLMN, etc.

Optionally, device to device (D2D) communication may be performed between the terminals 120.

Optionally, the 5G communication system or 5G network may also be referred to as a new radio (NR) system or an NR network.

FIG. 1 exemplarily illustrates a network device and two terminals. Alternatively, the communication system 100 may include multiple network devices and other numbers of terminals may be included within the coverage of each network device, which is not limited by embodiments of the present disclosure.

Optionally, the communication system 100 may also include other network entities such as network controllers, mobility management entities and the like, which are not limited by embodiments of the present disclosure.

It should be understood that a device having a communication function in a network/system in embodiments of the present disclosure may be referred to as a communication device. Taking the communication system 100 illustrated in FIG. 1 as an example, the communication device may include a network device 110 and a terminal 120 having a communication function, the network device 110 and the terminal 120 may be specific devices described above and will not be described here. The communication device may also include other devices in the communication system 100 such as network controllers, mobility management entities and other network entities, which are not limited in embodiments of the present disclosure.

It should be understood that the terms "system" and "network" of the present disclosure are often used interchangeably herein. In the present disclosure, the term "and/or" is merely an association relationship that describes an associated object and means that there may be three relationships, for example, A and/or B, which may mean that there are three situations: A alone, A and B at the same time, and B alone. In addition, the character "/" in the present disclosure generally means that the associated object is an "or" relationship.

In order to facilitate understanding of the technical solution of the embodiment of the present disclosure, the technical solution related to the embodiment of the present disclosure is described below.

With people's pursuit of speed, latency, high-speed mobility, energy efficiency as well as the diversity and complexity of business in future life, 3$^{rd}$ generation partnership project (3GPP) international standards organization began to develop 5G. The main application scenarios of 5G include enhanced mobile broadband (eMBB), ultra-reliable low-latency communications (URLLC) and massive machine-type communications (mMTC).

On the one hand, eMBB continues to target users for access to multimedia content, services and data, and its demand is growing rapidly. On the other hand, eMBB may be deployed in different scenarios, such as indoor, urban, rural, etc., and its capabilities and requirements are quite different, so it cannot be generalized and must be analyzed in detail in combination with specific deployment scenarios. Typical applications of URLLC include: industrial automation, power automation, telemedicine operation (surgery), traffic safety and so on. The typical characteristics of mMTC include: high connection density, small data volume, delay-insensitive services, low cost of modules and long service life.

In the early deployment of NR, it is difficult to obtain complete NR coverage, so the typical network coverage is wide-area LTE coverage and NR island coverage mode. Moreover, a large number of LTE are deployed below 6 GHz, and there are few spectrums below 6 GHz available for 5G. Therefore, the spectrum application above 6 GHz must be studied in NR, but the coverage of high frequency band has limited coverage and fast signal fading. At the same time, in order to protect the early investment of mobile operators in LTE, a working mode of tight interworking between LTE and NR is proposed.

RRC State

In order to reduce the delay of the radio signaling, quickly restore wireless connection and data service, a new radio resource control (RRC) state, that is, RRC inactive (RRC_I-NACTIVE) state is defined in 5G. This state is different from the RRC idle (RRC_IDLE) state and the RRC active (RRC_ACTIVE) state.

1) RRC_IDLE state (abbreviated as idle state): mobility is cell selection and cell reselection based on UE, paging is initiated by core network (CN), and paging area is configured by CN. There is no UE context and no RRC connection on the base station side.

2) RRC_CONNECTED state (abbreviated as connected state): RRC connection exists, and UE context exists on base station side and UE side. The network side knows that the location of the UE is a specific cell level. Mobility is the mobility controlled by the network side. Unicast data can be transmitted between the UE and the base station.

3) RRC_INACTIVE state (abbreviated as inactive state): mobility is cell selection and cell reselection based on UE, connection between CN and NR exists, UE context exists on a certain base station, paging is triggered by RAN, paging area based on RAN is managed by RAN, and network side knows that UE location is based on paging area level of RAN.

Early Measurement

In the first RRC connection reconfiguration message, the network side cannot configure carrier aggregation (CA) function or multi-rat dual connectivity (MR-DC) function since the network side has not obtained the measurement result of the terminal device at this time, and cannot correctly configure the CA function or MR-DC function for the terminal device. Generally, the measurement configuration is configured in the first RRC connection reconfiguration message, and then the terminal device performs a measurement based on the measurement configuration and reports the measurement result to the network side. At this time, the network side can determine to configure the appropriate CA function or MR-DC function according to the measurement result reported by the terminal device. In the implementation process, the time delay of this process is relatively large since the terminal device needs a time period from the beginning of measurement to the acquisition of measurement result. Of course, the network side can also configure CA function or MR-DC function in the first RRC connection reconfiguration message, but this only depends on blind configuration. Therefore, in order to quickly configure or establish SCell/SCG, the terminal device can be required to perform a measurement (i.e., early measurement) in the idle state or inactive state, and report the measurement result to the network side after the terminal device enters the connected state, and the network side can quickly configure or establish SCell/SCG according to the measurement result. On the NR side, the scenarios are MR-DC configuration and CA configuration, and the measurement frequency points supporting configuration can include NR frequency point list and E-UTRAN frequency point list. The frequency list of NR only supports the measurement of synchronization signal/PBCH Block (SSB), but does not support the measurement of channel status indicator reference signal (CSI-RS). The measurement of SSB includes the measurement of synchronous SSB and the measurement of asynchronous SSB. It should be noted that early measurement and measurements for cell selection and cell reselection are independent of each other.

The measurement and reporting of the early measurement are used for the terminal device in the idle state or the inactive state. The measurement configuration of early measurement is configured via RRC dedicated signaling (such as RRC release message) or system broadcast message (such as system information block (SIB)). The measurement configuration in the system broadcast message is common to the terminal device in the idle state and the terminal device in the inactive state. If the terminal device receives the measurement configuration of the early measurement through the RRC dedicated signaling, the measurement configuration obtained in the system broadcast message is overwritten. There are several sources of measurement configuration as illustrated in Table 1 below:

TABLE 1

| A first situation | All measurement configurations come from the RRC dedicated signaling (such as RRC release messages). |
| A second situation | All measurement configurations come from SIB, except measIdleDuration. |
| A third situation | The RRC dedicated signaling includes measIdleDuration and the EUTRA/NR carrier list. EUTRA carrier is configured in RRC dedicated signaling. For each NR carrier, the associated SSB configuration can be configured via RRC dedicated signaling or via SIB configuration. |

It should be noted that the NR/EUTRA carrier list cannot be configured separately in the RRC dedicated signaling and SIB. That is, either all of them are configured in the RRC dedicated signaling or all of them are configured in the SIB.

It should be noted that for the configuration information of synchronous SSB carriers, SIB2 or SIB4 (hereinafter abbreviated as SIB2/4) is reused, and the SSB configuration information in SIB2/4 will not be reconfigured in other SIBs.

It should be noted that SSB measurement configuration for early measurement purposes only (which can also be abbreviated as SSB configuration) can be configured in dedicated signaling (such as RRC release message) or SIB. If the terminal device obtains the SSB measurement configuration from the dedicated signaling, the SSB measurement configuration configured in the SIB is ignored. If the terminal device does not obtain the SSB measurement configuration from the RRC dedicated signaling, the SSB measurement configuration is obtained from the SIB.

The reporting of measurement result of early measurement is based on the request of the network side, and the report of measurement result (that is, the report of measurement result including reference signal received power (RSRP)/reference signal received quality (RSRQ)) can only be reported after the access stratum (AS) is safely activated. The cell will indicate that it supports the measurement report of early measurement in the system broadcast message (through idleModeMeasurements). For example, the LTE cell indicates that the current cell supports the measurement report of NR frequency point through idleModeMeasures in SIB2.

The terminal device indicates to the network side that there is a measurement result in the RRC setup completion (RRCSetupComplet) message or the RRC resumed completion (RRCResumeComplete) message.

Figure 2A:
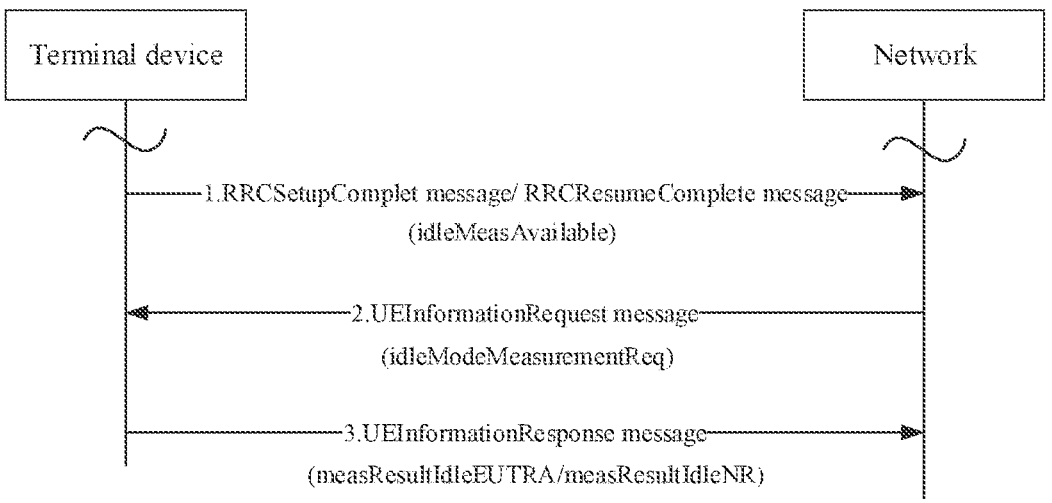
FIG. 2A is a first flow diagram of reporting a measurement result provided by an embodiment of the present disclosure.

Referring to FIG. 2A, for idle terminal device and inactive terminal device, the terminal device adds indication information (i.e. idleMeasAvailable) to the RRC setup completion (RRCSetupComplet) message or the RRC resumed completion (RRCResumeComplete) message, and the indication information is used to indicate that there is a measurement result that can be reported in the terminal device. Then, the network side requests the measurement result through a UE information request (UEInformationRequest) message. Then, the terminal device reports the measurement result through a UE information response (UEInformationResponse) message.

Figure 2B:
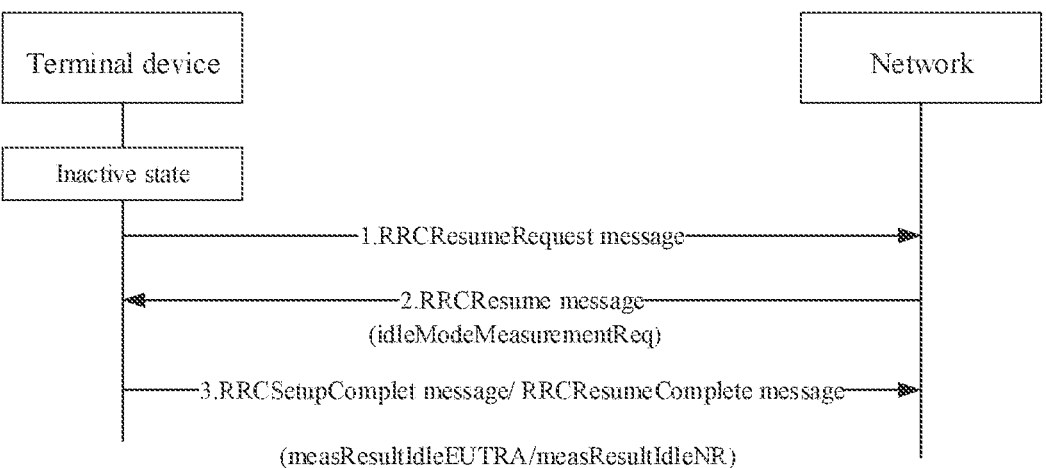
FIG. 2B is a second flow diagram of reporting a measurement result provided by an embodiment of the present disclosure.

Referring to FIG. 2B, for the inactive terminal device, the measurement result can also be reported through RRC setup completion (RRCSetupComplet) message or RRC resumed completion (RRCResumeComplete) message.

It should be noted that the measurement result will not be deleted until the terminal device has sent the measurement result to the network side successfully, that is, the measurement result will not be deleted until the terminal device has sent the UEInformationResponse message, the RRCSetupComplet message or the RRCResumeComplete message.

Important parameters that control the execution of a measurement include a timer T331 for the execution of the measurement and a validity area list (validityAreaList) for the execution of the measurement. The timer T331 can only be configured by the RRC dedicated signaling (such as RRC release message), and cannot be configured by the system broadcast message (such as SIB). The validityAreaList for the execution of the measurement can be configured in the RRC dedicated signaling or in the system broadcast messages such as SIB. It should be noted that a validityAreaList for the execution of the measurement is composed of a frequency point and an optional physical cell identity (PCI) list, and does not contain inter-RAT cells. The network side can configure a validityAreaList for the terminal device. If the validityAreaList is not configured, it means that there is no measurement area restriction. If the terminal device leaves the measurement validity area of the early measurement, the timer T331 is stopped. If the timer times out or stops, the terminal device releases (i.e. deletes) the measurement configuration of the early measurement. After the measurement configuration is released, it is determined, depending on the implementation of the terminal device, whether to continue the early measurement in the idle/inactive state according to the measurement configuration in the SIB. The conditions that trigger the timer T331 to stop also include: ① the terminal device has received the RRC setup message or the RRC resumed message; ② the terminal device has received an RRC release message (applied in the 2-step resume process) and the RRC release message contains a measurement configuration of the early measurement (i.e. measIdleConfig); ③ the terminal device has performed cell reselection of inter-RAT.

If the RRC release message received by the terminal device (applied in the 2-step resume process) does not contain the measurement configuration of the early measurement (i.e. measIdleConfig), the terminal device continues to run timer T331 and continues to maintain the measurement configuration. Specifically, in the 2-step RRC resume process, if the RRC release message does not contain the measurement configuration in the idle state, there is no influence on the measurement configuration of the existing configuration, that is, the timer T331 continues to run and the measurement configuration continues to be maintained. If the RRC release message contains the measurement configuration in the idle state, the measurement configuration of the existing configuration is completely replaced. If the RRC release message contains release indication information (i.e. releaseIdleMeasConfig), the measurement configuration in the idle state is released.

The terminal device starts the early measurement if and only if the measIdleDuration (i.e. timer T331) is configured.

If the measured target frequency point is an E-UTRAN frequency point, if the terminal device does not support MR-DC between the current serving cell and the target frequency point, the terminal device can stop performing a measurement on the target frequency point. If the measured target frequency point is NR frequency point, if the terminal device does not support MR-DC or CA between the current serving cell and the target frequency point, the terminal device can stop performing a measurement on the target frequency point. If the SSB configuration for a certain frequency point configured by the RRC dedicated signaling is different from the SSB configuration for the frequency point in the current serving cell broadcast, the terminal device is not required to perform a measurement on the SSB for the frequency point. If the initial configuration of SSB configuration for a certain frequency point is obtained from the system broadcast, but the cell has been re-selected to another target cell, and the SSB configuration for the frequency point is not in the system broadcast message of the target cell, the terminal device may not perform the measurement on the frequency point.

If the terminal device is re-selected to a cell whose system broadcast message does not contain a measurement indication (i.e. idleModeMeasurements) that the current cell supports early measurement, the terminal device may not perform early measurement, but the timer T331 continues to run.

When the terminal device is in any cell selection state or camp on any cell state, the terminal device is not triggered to stop timer T331 at this time, and the measurement configuration of early measurement will not be deleted.

When the terminal device transitions from the inactive state to the idle state, the timer T331 continues to run and the measurement configuration continues to be valid.

The parameters of measurement configuration of early measurement are as follows: for reporting the measurement result of cells, the network side can configure the reported measurement quantities as one of the following: RSRP, RSRQ and both (representing RSRP and RSRQ). The reported cell measurement result does not support layer 3 (L3) filtering. For reporting the measurement result of beams, the network side can configure the reported measurement quantities as one of the following: RSRP, RSRQ and both (representing RSRP and RSRQ). There are three forms of reporting measurement result of beams: only reporting measurement result of beams, only reporting beam index, reporting beam index and measurement result of beams. The filtering of beam measurement depends on the implementation of terminal device. The network side can configure that the terminal device reports the measurement results of more than one beam, and the terminal device reports the measurement result of the strongest beam by default. At the same time, the network side will also configure a threshold, and only the measurement results of beams higher than the threshold can be reported. In addition, the measurement results are sorted according to RSRP. If only RSRQ reporting is configured, the measurement results are sorted by RSRQ.

If the terminal device acquires only the measurement configuration of the E-UTRAN frequency point through the system broadcast message, and then is re-selected to a cell in which the E-UTRAN frequency point list and the NR frequency point list are simultaneously configured in the system broadcast message, the terminal device should adopt the measurement configuration of the NR frequency point list.

Considering the power consumption of base station, the SSB period configured in SIB2/4 may be different in different cells with the same frequency layer. For example, in the scenario of 3.5 GHz deployment, there are macro cells (mainly playing the role of coverage) and small cells (mainly playing the role of capacity), and the small cells can be set to have the maximum SSB period after unloading, such as 160 ms, and the macro cells are set to have the default SSB period. At this time, the small cell is also called sleeper cell. For this purpose, in SIB2/4, two SSB measurement timing configurations (SMTCs) are configured for each frequency layer. One of the two SMTCs is a long period SMTC, a PCI list is configured, and the PCI list is used for determining one or more sleeper cells, that is, the long period SMTC is an SMTC for measurement of the sleeper cell. It should be noted that SMTC appears periodically in the time domain, and the terminal device performs a measurement on the SSB in the time range corresponding to SMTC, but does not perform a measurement on the SSB at other time. For the measurement configuration of early measurement, how to avoid performing a measurement on the sleeper cell by terminal device needs to be solved. Therefore, the following technical solution of the embodiment of the disclosure is provided.

FIG. 3 is a flow diagram of a measurement method provided by an embodiment of the present disclosure. As illustrated in FIG. 3, the measurement method includes the following operations.

At block 301, a terminal device receives a first measurement configuration from a first network device, the first measurement configuration being a measurement configuration for an idle state or an inactive state. The first measurement configuration carries at least one of first indication information or second indication information, the first indication information being used for indicating at least one of a cell on which the terminal device does not need to perform a measurement or a cell of which the terminal device does not need to report a measurement result, and the second indication information being used for indicating at least one of a cell on which the terminal device needs to perform a measurement or a cell of which the terminal device needs to report a measurement result.

At block 302, the terminal device performs a measurement based on the first measurement configuration in the idle state or the inactive state, and reports a measurement result to the first network device or a second network device after the terminal device enters a connected state.

In the embodiment of the present disclosure, a first network device sends a first measurement configuration to a terminal device, and accordingly, the terminal device receives the first measurement configuration from the first network device. In an optional manner, the first network device is a base station, such as a gNB. In an optional manner, the first measurement configuration is carried in RRC dedicated signaling, and further, optionally, the RRC dedicated signaling may be an RRC release message.

In the embodiment of the present disclosure, the first measurement configuration is a measurement configuration for an idle state or an inactive state, the terminal device performs a measurement based on the first measurement configuration in the idle state or the inactive state, and reports a measurement result to the first network device or a second network device after the terminal device enters a connected state. In an optional manner, the second network device is a base station, such as a gNB. That is, the first measurement configuration is a measurement configuration of an early measurement. In the specific implementation, the first measurement configuration is implemented by MeasIdleConfig, and the contents of MeasIdleConFIG refer to Table 2 below.

In the embodiment of the present disclosure, the first measurement configuration carrying at least one of first indication information or second indication information, the first indication information being used for indicating at least one of a cell on which the terminal device does not need to perform a measurement or a cell of which the terminal device does not need to report a measurement result, and the second indication information being used for indicating at least one of a cell on which the terminal device needs to perform a measurement or a cell of which the terminal device needs to report a measurement result.

In an optional manner, the first indication information is used to indicate one or more first cells. Here, optionally, the first cell may be a small cell or a sleeper cell. For the first cell, the terminal device does not need to perform a measurement on the cell and/or report the measurement result of the cell.

In an optional manner, the second indication information is used for one or more second cells. Here, optionally, the second cell may be a macro cell. For the second cell, the terminal device needs to perform a measurement on the cell and/or report the measurement result of the cell.

In the embodiment of the present disclosure, the first indication information may be implemented by a first PCI list, and the second indication information may be implemented by a second PCI list. The first PCI list can also be understood as a black list, and the second PCI list can also be understood as a white list. The contents of the first measurement configuration are described below.

The first measurement configuration includes configuration information of at least one frequency point (refer to Table 2 below), and the at least one frequency point includes a first frequency point. Configuration information of the first frequency point includes synchronization signal block (SSB) configuration information, the SSB configuration information includes at least one of a first physical cell identification (PCI) list or a second PCI list, the first PCI list is used for indicating at least one of: that the terminal device does not need to perform a measurement on a cell corresponding to the first PCI list when performing a measurement on an SSB at the first frequency point, or that the terminal device does not need to report a measurement result of a cell corresponding to the first PCI list when performing the measurement on the SSB at the first frequency point, and the second PCI list is used for indicating at least one of: that the terminal device needs to perform a measurement on a cell corresponding to the second PCI list when performing the measurement on the SSB at the first frequency point, or that the terminal device needs to report, a measurement result of a cell corresponding to the second PCI list when performing the measurement on the SSB at the first frequency point.

It should be noted that, the above solution is illustrated by taking a first frequency point as an example and not limited thereto. The at least one frequency point may include a plurality of first frequency points, the configuration information of each first frequency point may include SSB configuration information corresponding to each first frequency point, and the SSB configuration information includes a black list (i.e., a first PCI list) and/or a white list (i.e., a second PCI list).

In an optional manner, in response to that the first frequency point has a first SSB measurement timing configuration (SMTC) and a second SMTC in a system broadcast message, the first PCI list in the SSB configuration information of the first frequency point is a PCI list configured in the second SMTC, and a period of the second SMTC being longer than a period of the first SMTC.

Here, optionally, the system broadcast message may be SIB2 or SIB4 (abbreviated to SIB2/4). The system broadcast message may be configured with two SMTCs for each of one or more frequency points, the two SMTCs are respectively a first SMTC and a second SMTC. The first SMTC can also be referred to as smtc, and the second SMTC can also be referred to as smtc2-LP. The period of the smtc2-LP is longer than the period of the SMTC, for example, the period of the smtc2-LP is 160 ms. In response to that the first frequency point has a first SMTC and a second SMTC in a system broadcast message, the first PCI list in the SSB configuration information of the first frequency point is a PCI list configured in the second SMTC. Here, a PCI list is configured in the second SMTC, and the PCI list is used to indicate that the cell corresponding to the PCI list adopts the second SMTC when performing SSB measurement.

In an optional manner, in response to that the first frequency point has a first SMTC and a second SMTC in a system broadcast message, a PCI list configured in the second SMTC is used for indicating that the terminal device does not need to perform a measurement on a cell corresponding to the PCI list when performing the measurement on the SSB at the first frequency point, and/or the terminal device does not need to report a measurement result of a cell corresponding to the PCI list when performing the measurement on the SSB at the first frequency point. The period of the second SMTC is longer than the period of the first SMTC.

Here, optionally, the system broadcast message may be SIB2 or SIB4 (abbreviated to SIB2/4). The system broadcast message may be configured with two SMTCs for each of one or more frequency points, the two SMTCs are respectively a first SMTC and a second SMTC. The first SMTC can also be referred to as smtc, and the second SMTC can also be referred to as smtc2-LP. The period of the smtc2-LP is longer than the period of the SMTC, for example, the period of the smtc2-LP is 160 ms. In response to that the first frequency point has a first SMTC and a second SMTC in a system broadcast message, a PCI list configured in the second SMTC is used for indicating at least one of: that the terminal device does not need to perform a measurement on a cell corresponding to the PCI list when performing the measurement on the SSB at the first frequency point, or that the terminal device does not need to report a measurement result of a cell corresponding to the PCI list when performing the measurement on the SSB at the first frequency point.

In an optional manner, in response to that the first frequency point has a first SMTC and a second SMTC in a system broadcast message, the SSB configuration information of the first frequency point forcibly includes the second PCI list, and a period of the second SMTC is longer than a period of the first SMTC.

Here, optionally, the system broadcast message may be SIB2 or SIB4 (abbreviated to SIB2/4). The system broadcast message may be configured with two SMTCs for each of one or more frequency points, the two SMTCs are respectively a first SMTC and a second SMTC. The first SMTC can also be referred to as smtc, and the second SMTC can also be referred to as smtc2-LP. The period of the smtc2-LP is longer than the period of the SMTC, for example, the period of the smtc2-LP is 160 ms. In response to that the first frequency point has a first SMTC and a second SMTC in a system broadcast message, the SSB configuration information of the first frequency point forcibly includes the second PCI list.

In an optional manner, in response to that the first frequency point has a first SMTC and a second SMTC in a system broadcast message, the SSB configuration information of the first frequency point forcibly includes the first PCI list, and a period of the second SMTC is longer than a period of the first SMTC.

Here, optionally, the system broadcast message may be SIB2 or SIB4 (abbreviated to SIB2/4). The system broadcast message may be configured with two SMTCs for each of one or more frequency points, the two SMTCs are respectively a first SMTC and a second SMTC. The first SMTC can also be referred to as smtc, and the second SMTC can also be referred to as smtc2-LP. The period of the smtc2-LP is longer than the period of the SMTC, for example, the period of the smtc2-LP is 160 ms. In response to that the first frequency point has a first SMTC and a second SMTC in a system broadcast message, the SSB configuration information of the first frequency point forcibly includes the first PCI list.

In an optional manner of the present disclosure, the at least one frequency point further includes a second frequency point, configuration information of the second frequency point does not include SSB configuration information. In this case, the terminal device acquires SSB configuration information and SMTC which correspond to the second frequency point from a system broadcast message; and the terminal device performs a measurement on the SSB at the second frequency point based on the SSB configuration information and the SMTC which correspond to the second frequency point.

Further, optionally, in response to that the second frequency point has a first SMTC and a second SMTC in a system broadcast message, the SMTC is configured as the first SMTC, and a period of the second SMTC is longer than a period of the first SMTC.

Further, optionally, in response to that the second frequency point only has one SMTC in a system broadcast message, the SMTC is configured as the one SMTC.

In the above solution of the embodiment of the present disclosure, the first measurement configuration is implemented by MeasIdleConfig, and the contents of MeasIdle-ConFIG refer to Table 2 below.

TABLE 2

```
-- ASN1START
-- TAG-MEASIDLECONFIG-START
MeasIdleConfigSIB-r16 ::= SEQUENCE {
    measIdleCarrierListNR-r16          SEQUENCE (SIZE (1..maxFreqIdle-r16) ) OF
MeasIdleCarrierNR-r16                  OPTIONAL,     -- Need S
    measIdleCarrierListEUTRA-r16       SEQUENCE (SIZE (1..maxFreqIdle-r16) ) OF
MeasIdleCarrierEUTRA-r16               OPTIONAL,     -- Need S
    ...
}
MeasIdleConfigDedicated-r16 ::= SEQUENCE {
    measIdleCarrierListNR-r16          SEQUENCE (SIZE (1..maxFreqIdle-r16) ) OF
MeasIdleCarrierNR-r16                  OPTIONAL,     -- Need N
    measIdleCarrierListEUTRA-r16       SEQUENCE (SIZE (1..maxFreqIdle-r16) ) OF
MeasIdleCarrierEUTRA-r16               OPTIONAL,     -- Need N
    measIdleDuration-r16               ENUMERATED{sec10, sec30, sec60, sec120, sec180, sec240,
sec300, spare},
    validityAreaList-r16               ValidityAreaList-r16
OPTIONAL,      -- Need N
    ...
}
ValidityAreaList-r16 ::= SEQUENCE (SIZE (1..maxFreqIdle-r16) ) OF ValidityArea-r16
ValidityArea-r16 ::=                   SEQUENCE {
    carrierFreq-r16                        ARFCN-ValueNR,
    validityCellList-r16                   ValidityCellList            OPTIONAL     -- Need N
}
ValidityCellList ::= SEQUENCE (SIZE (1.. maxCellMeasIdle-r16) ) OF PCI-Range
MeasIdleCarrierNR-r16 ::=              SEQUENCE {
    carrierFreqNR-r16                      ARFCN-ValueNR,
    ssbSubcarrierSpacing-r16               SubcarrierSpacing,
    frequencyBandList                      MultiFrequencyBandListNR    OPTIONAL,    -- Need R
    measCellListNR-r16                     CelllistNR-r16              OPTIONAL,    -- Need R
    reportQuantities-r16               ENUMERATED {rsrp, rsrq, both},
    qualityThreshold-r16                   SEQUENCE {
      idleRSRP-Threshold-NR-r16            RSRP-Range                  OPTIONAL,    -- Need R
      idleRSRQ-Threshold-NR-r16            RSRQ-Range                  OPTIONAL,    -- Need R
    }                                                                  OPTIONAL,    -- Need R
    ssb-MeasConfig-r16                 SEQUENCE {
      nrofSS-BlocksToAverage-r16               INTEGER (2..maxNrofSS-BlocksToAverage)
OPTIONAL,      -- Need FFS
      absThreshSS-BlocksConsolidation-r16 ThresholdNR
OPTIONAL,      -- Need FFS
      smtc-r16                             SSB-MTC
OPTIONAL,      -- Need FFS
      ssb-ToMeasure-r16                    SSB-ToMeasure
OPTIONAL,      -- Need FFS
      deriveSSB-IndexFromCell-r16          BOOLEAN,
      ss-RSSI-Measurement-r16              SS-RSSI-Measurement
OPTIONAL
```

TABLE 2-continued

| | | | |
|---|---|---|---|
| } | | OPTIONAL, | -- Need R |
| beamMeasConfigIdle-r16 | BeamMeasConfigIdle-NR-r16 | OPTIONAL, | -- Need R |
| ... | | | |
| } | | | |
| MeasIdleCarrierEUTRA-r16 ::= | SEQUENCE { | | |
| carrierFreqEUTRA-r16 | ARFCN-ValueEUTRA, | | |
| allowedMeasBandwidth-r16 | EUTRA-AllowedMeasBandwidth, | | |
| measCellListEUTRA-r16 | CellListEUTRA-r16 | OPTIONAL, | -- Need R |
| reportQuantitiesEUTRA-r16 | ENUMERATED {rsrp, rsrq, both}, | | |
| qualityThreshold-r16 | SEQUENCE { | | |
| idleRSRP-Threshold-EUTRA-r16 | RSRP-RangeEUTRA | OPTIONAL, | -- Need R |
| idleRSRQ-Threshold-EUTRA-r16 | RSRQ-RangeEUTRA-r16 | OPTIONAL, | -- Need R |
| } | | OPTIONAL, | -- Need S |
| ... | | | |
| } | | | |
| CellListNR-r16 ::= | SEQUENCE (SIZE (1..maxCellMeasIdle-r16) ) OF PCI-Range | | |
| CellListEUTRA-r16 ::= | SEQUENCE (SIZE (1..maxCellMeasIdle-r16) ) OF EUTRA-PhysCellIdRange | | |
| BeamMeasConfigIdle-NR-r16 ::= | SEQUENCE { | | |
| reportQuantityRS-Indexes-r16 | ENUMERATED {rsrp, rsrq, both} | | |
| maxNrofRS-IndexesToReport-r16 | INTEGER (1.. maxNrofIndexesToReport) | | |
| includeBeamMeasurements-r16 | BOOLEAN | | |
| } | | | |
| RSRQ-RangeEUTRA-r16 ::= | INTEGER (−30..46) | | |
| -- TAG-MEASIDLECONFIG-STOP | | | |
| -- ASN1STOP | | | |

In the above solution of the embodiment of the present disclosure, the system broadcast message is implemented by SIB2 or SIB4, and the following Table 3 gives smtc and smtc2-LP of a certain frequency point taking SIB2 as an example.

TABLE 3

| | |
|---|---|
| SIB2 ::= | SEQUENCE { |
| cellReselectionInfoCommon | SEQUENCE { |
| nrofSS-BlocksToAverage | INTEGER (2..maxNrofSS-BlocksToAverage) |
| OPTIONAL,    -- Need S | |
| absThreshSS-BlocksConsolidation | ThresholdNR |
| OPTIONAL,    -- Need S | |
| rangeToBestCell | RangeToBestCell |
| OPTIONAL,    -- Need R | |
| q-Hyst | ENUMERATED { |
| | dB0, dB1, dB2, dB3, dB4, dB5, dB6, dB8, dB10, |
| | dB12, dB14, dB16, dB18, dB20, dB22, dB24}, |
| speedStateReselectionPars | SEQUENCE { |
| mobilityStateParameters | MobilityStateParameters, |
| q-HystSF | SEQUENCE { |
| sf-Medium | ENUMERATED {dB-6, dB-4, dB-2, dB0}, |
| sf-High | ENUMERATED {dB-6, dB-4, dB-2, dB0} |
| } | |
| } | |
| OPTIONAL,    -- Need R | |
| ..., | |
| [[ | |
| relaxedMeasurement-r16 | SEQUENCE { |
| lowMobilityEvalutation-r16 | SEQUENCE { |
| s-SearchDeltaP-r16 | ENUMERATED { |
| | dB3, dB6, dB9, dB12, dB15, |
| | spare3, spare2, spare1} |
| OPTIONAL,    -- Need S | |
| t-SearchDeltaP-r16 | ENUMERATED { |
| | s5, s10, s20, s30, s60, s120, s180, |
| | s240, s300, spare7, spare6, spare5, |
| | spare4, spare3, spare2, spare1} |
| OPTIONAL    -- Need S | |
| } | |
| OPTIONAL,    -- Cond OptMandatory | |
| cellEdgeEvalutation-r16 | SEQUENCE { |
| s-SearchThresholdP-r16 | ReselectionThreshold |
| OPTIONAL,    -- Need R | |
| s-SearchThresholdQ-r16 | ReselectionThresholdQ |
| OPTIONAL,    -- Need R | |
| } | |
| OPTIONAL,    -- Cond OptMandatory | |

TABLE 3-continued

```
      relaxedMeasCondition-r16              ENUMERATED {
                                              lowMobilityOrNotAtCellEdge,
                                              lowMobilityAndNotAtCellEdge}
OPTIONAL,       -- Cond MultRelaxCriteria
      highPriorityMeasRelax-r16             ENUMERATED {true}
OPTIONAL,       -- Need R
      }
OPTIONAL,       -- Need R
      ]]
      },
      cellReselectionServingFreqInfo        SEQUENCE {
        s-NonIntraSearchP                     ReselectionThreshold
OPTIONAL,       -- Need S
        s-NonIntraSearchQ                     ReselectionThresholdQ
OPTIONAL,       -- Need S
        threshServingLowP                     ReselectionThreshold,
        threshServingLowQ                     ReselectionThresholdQ
OPTIONAL,       -- Need R
        cellReselectionPriority               CellReselectionPriority,
        cellReselectionSubPriority            CellReselectionSubPriority
OPTIONAL,       -- Need R
        ...
      },
      intraFreqCellReselectionInfo          SEQUENCE {
        q-RxLevMin                            Q-RxLevMin,
        q-RxLevMinSUL                         Q-RxLevMin
OPTIONAL,       -- Need R
        q-QualMin                             Q-QualMin
OPTIONAL,       -- Need S
        s-IntraSearchP                        ReselectionThreshold,
        s-IntraSearchQ                        ReselectionThresholdQ
OPTIONAL,       -- Need S
        t-ReselectionNR                       T-Reselection,
        frequencyBandList                     MultiFrequencyBandListNR-SIB
OPTIONAL,       -- Need S
        frequencyBandListSUL                  MultiFrequencyBandListNR-SIB
OPTIONAL,       -- Need R
        p-Max                                 P-Max
OPTIONAL,       -- Need S
        smtc                                  SSB-MTC
OPTIONAL,       -- Need S
        ss-RSSI-Measurement                   SS-RSSI-Measurement
OPTIONAL,       -- Need R
        ssb-ToMeasure                         SSB-ToMeasure
OPTIONAL,       -- Need S
        deriveSSB-IndexFromCell               BOOLEAN,
        ...,
        [[
        t-ReselectionNR-SF                    SpeedStateScaleFactors
OPTIONAL,       -- Need N
        ]],
        [[
        smtc2-LP-r16                          SSB-MTC2-LP-r16
OPTIONAL,       -- Need R
        ssb-PositionQCL-Common-r16            SSB-PositionQCL-Relationship-r16
OPTIONAL,       -- Need R
        ]]
      },     ...
}
RangeToBestCell ::=   Q-OffsetRange
-- TAG-SIB2-STOP
-- ASN1STOP
```

According to the technical solution of the embodiment of the present disclosure, the SSB configuration for a certain frequency point can be configured in RRC dedicated signaling (such as RRC release message), or can be configured in system broadcast message (such as SIB2 or SIB4). The terminal device obtains the SSB configuration from the RRC dedicated signaling, and if the RRC dedicated signaling does not carry the SSB configuration, the terminal device obtains the SSB configuration from the system broadcast message.

According to the technical solution of the embodiment of the disclosure, for the scenario of multi-SMTC configuration, the process of obtaining SSB configuration by the terminal device is specified, and the network is constrained to configure an appropriate PCI list, so that the sleeper cell is not included in the measurement report or the terminal device adopts the appropriate SSB configuration to obtain the correct measurement result.

Figure 4:
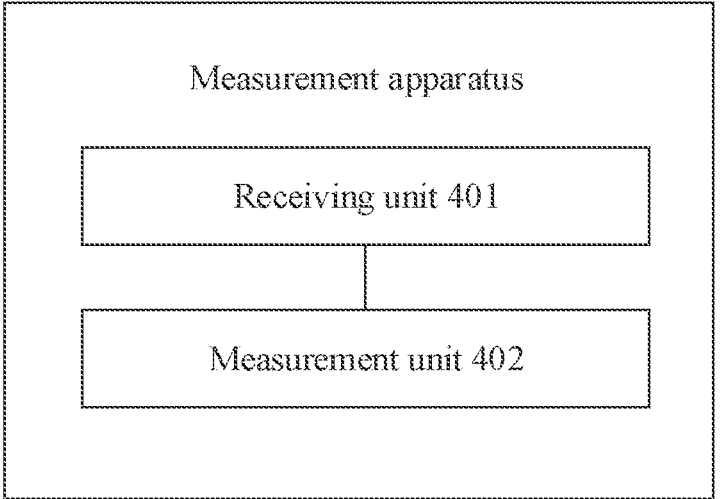
FIG. 4 is a schematic diagram of a first structural composition of a measurement apparatus provided by the embodiment of the present disclosure.

FIG. 4 is a schematic diagram of a first structural composition of a measurement apparatus provided by the embodiment of the present disclosure, and the measurement apparatus is applied to a terminal device. As illustrated in FIG. 4, the measurement apparatus includes a receiving unit 401 and a measurement unit 402.

The receiving unit 401 is configured to receive a first measurement configuration from a first network device, the first measurement configuration being a measurement configuration for an idle state or an inactive state. The first measurement configuration carries at least one of first indication information or second indication information, the first indication information being used for indicating at least one of a cell on which the terminal device does not need to perform a measurement or a cell of which the terminal device does not need to report a measurement result, and the second indication information being used for indicating at least one of a cell on which the terminal device needs to perform a measurement or a cell of which the terminal device needs to report a measurement result.

The measurement unit 402 is configured to perform a measurement based on the first measurement configuration in the idle state or the inactive state, and report a measurement result to the first network device or a second network device after the terminal device enters a connected state.

In an optional manner, the first measurement configuration includes configuration information of at least one frequency point, and the at least one frequency point includes a first frequency point.

Configuration information of the first frequency point includes synchronization signal block (SSB) configuration information, the SSB configuration information includes a first physical cell identification (PCI) list and/or a second PCI list. The first PCI list is used for indicating that the terminal device does not need to perform a measurement on a cell corresponding to the first PCI list when performing a measurement on an SSB at the first frequency point, and/or that the terminal device does not need to report a measurement result of a cell corresponding to the first PCI list when performing the measurement on the SSB at the first frequency point. The second PCI list is used for indicating that the terminal device needs to perform a measurement on a cell corresponding to the second PCI list when performing the measurement on the SSB at the first frequency point, and/or that the terminal device needs to report a measurement result of a cell corresponding to the second PCI list when performing the measurement on the SSB at the first frequency point.

In an optional manner, in response to that the first frequency point has a first SSB measurement timing configuration (SMTC) and a second SMTC in a system broadcast message, the first PCI list in the SSB configuration information of the first frequency point is a PCI list configured in the second SMTC, and a period of the second SMTC being longer than a period of the first SMTC.

In an optional manner, in response to that the first frequency point has a first SMTC and a second SMTC in a system broadcast message, a PCI list configured in the second SMTC is used for indicating that the terminal device does not need to perform a measurement on a cell corresponding to the PCI list when performing the measurement on the SSB at the first frequency point, and/or that the terminal device does not need to report a measurement result of a cell corresponding to the PCI list when performing the measurement on the SSB at the first frequency point. The period of the second SMTC is longer than the period of the first SMTC.

In an optional manner, in response to that the first frequency point has a first SMTC and a second SMTC in a system broadcast message, the SSB configuration information of the first frequency point forcibly includes the second PCI list, and a period of the second SMTC is longer than a period of the first SMTC.

In an optional manner, the at least one frequency point further includes a second frequency point, configuration information of the second frequency point does not include SSB configuration information, the apparatus further including an acquiring unit.

The acquiring unit (not illustrated in the figure) is configured to acquire SSB configuration information and SMTC which correspond to the second frequency point from a system broadcast message.

The measuring unit 402 is further configured to perform a measurement on the SSB at the second frequency point based on the SSB configuration information and the SMTC which correspond to the second frequency point.

In an optional manner, in response to that the second frequency point has a first SMTC and a second SMTC in a system broadcast message, the SMTC is configured as the first SMTC, and a period of the second SMTC is longer than a period of the first SMTC.

It will be understood by those skilled in the art that the above description of the measurement apparatus of the embodiment of the present disclosure may be understood with reference to the description of the measurement method of the embodiment of the present disclosure.

Figure 5:
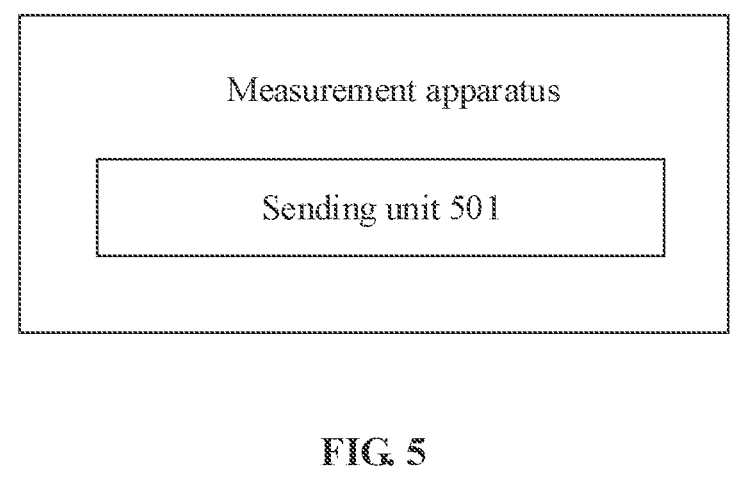

FIG. 5 is a schematic diagram of a second structural composition of a measurement apparatus provided by the embodiment of the present disclosure, and the measurement apparatus is applied to a first network device. As illustrated in FIG. 5, the measurement apparatus includes a sending unit 501.

The sending unit 501 is configured to send a first measurement configuration to a terminal device, the first measurement configuration being a measurement configuration for an idle state or an inactive state. The first measurement configuration carries at least one of first indication information or second indication information, the first indication information being used for indicating at least one of a cell on which the terminal device does not need to perform a measurement or a cell of which the terminal device does not need to report a measurement result, and the second indication information being used for indicating at least one of a cell on which the terminal device needs to perform a measurement or a cell of which the terminal device needs to report a measurement result.

The first measurement configuration is used for the terminal device to perform a measurement in the idle state or the inactive state, and the terminal device reports a measurement result to the first network device or a second network device after the terminal device enters a connected state.

In an optional manner, the first measurement configuration includes configuration information of at least one frequency point, and the at least one frequency point includes a first frequency point.

Configuration information of the first frequency point includes synchronization signal block (SSB) configuration information, the SSB configuration information includes at least one of a first physical cell identification (PCI) list or a second PCI list. The first PCI list is used for indicating that the terminal device does not need to perform a measurement on a cell corresponding to the first PCI list when performing a measurement on an SSB at the first frequency point, and/or that the terminal device does not need to report a measurement result of a cell corresponding to the first PCI list when performing the measurement on the SSB at the first frequency point. The second PCI list is used for indicating that the terminal device needs to perform a measurement on a cell corresponding to the second PCI list when performing the measurement on the SSB at the first frequency point, and/or that the terminal device needs to report a measurement result of a cell corresponding to the second PCI list when performing the measurement on the SSB at the first frequency point.

In an optional manner, in response to that the first frequency point has a first SSB measurement timing configuration (SMTC) and a second SMTC in a system broadcast message, the first PCI list in the SSB configuration information of the first frequency point is a PCI list configured in the second SMTC, and a period of the second SMTC being longer than a period of the first SMTC.

In an optional manner, in response to that the first frequency point has a first SMTC and a second SMTC in a system broadcast message, a PCI list configured in the second SMTC is used for indicating that the terminal device does not need to perform a measurement on a cell corresponding to the PCI list when performing the measurement on the SSB at the first frequency point, and/or that the terminal device does not need to report a measurement result of a cell corresponding to the PCI list when performing the measurement on the SSB at the first frequency point. The period of the second SMTC is longer than the period of the first SMTC.

In an optional manner, in response to that the first frequency point has a first SMTC and a second SMTC in a system broadcast message, the SSB configuration information of the first frequency point forcibly includes the second PCI list, and a period of the second SMTC is longer than a period of the first SMTC.

It will be understood by those skilled in the art that the above description of the measurement apparatus of the embodiment of the present disclosure may be understood with reference to the description of the measurement method of the embodiment of the present disclosure.

Figure 6:
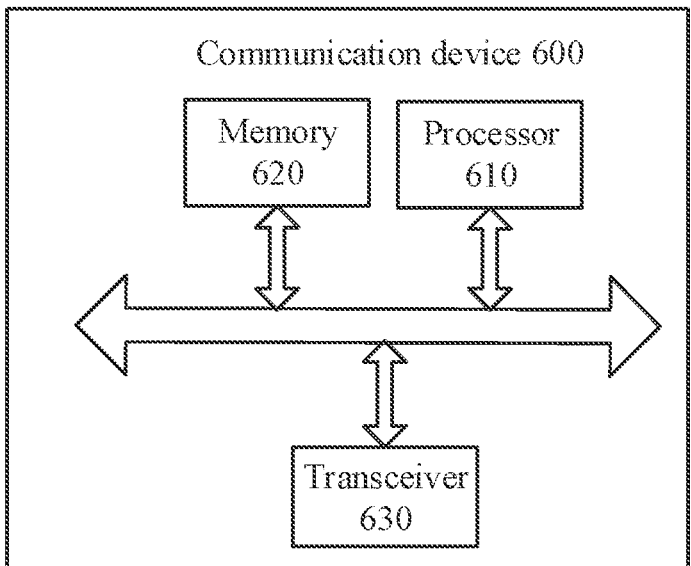
FIG. 6 is a schematic structure diagram of a communication device provided by an embodiment of the present disclosure.

FIG. 6 is a schematic structure diagram of a communication device 600 provided by an embodiment of the present disclosure. The communication device may be a terminal device or a network device. The communication device 600 illustrated in FIG. 6 includes a processor 610 that can call and run a computer program from memory to execute the method in an embodiment of the present disclosure.

Optionally, as illustrated in FIG. 6, the communication device 600 may also include a memory 620. The processor 610 that can call and run a computer program from memory 620 to execute the method in the embodiment of the present disclosure.

The memory 620 may be a separate device independent of the processor 610 or may be integrated in the processor 610.

Optionally, as illustrated in FIG. 6, the communication device 600 may also include a transceiver 630, the processor 610 may control the transceiver 630 to communicate with other devices, and in particular may send information or data to other devices, or receive information or data sent by other devices.

The transceiver 630 may include a transmitter and a receiver. The transceiver 630 may further include antennas, and the number of antennas may be one or more.

Optionally, the communication device 600 may be specifically a network device of the embodiments of the present disclosure, and the communication device 600 may implement corresponding processes implemented by the network device in the respective methods of the embodiments of the present disclosure, which will not be repeated here for the sake of brevity.

Optionally, the communication device 600 may be specifically a mobile terminal/a terminal device of an embodiment of the present disclosure, and the communication device 600 may implement corresponding processes implemented by the mobile terminal/the terminal device in the respective methods of the embodiment of the present disclosure, which will not be repeated here for the sake of brevity.

Figure 7:
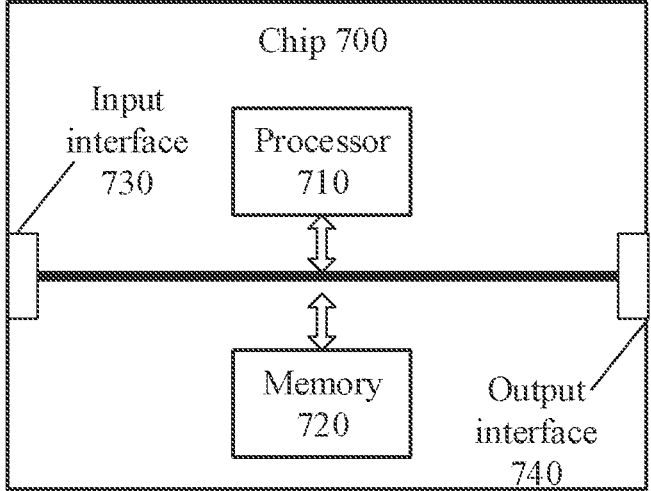
FIG. 7 is a schematic structure diagram of a chip according to an embodiment of the present disclosure.

FIG. 7 is a schematic structure diagram of a chip according to an embodiment of the present disclosure. A chip 700 illustrated in FIG. 7 includes a processor 710 that can call and run a computer program from memory to execute the method in an embodiment of the present disclosure.

Optionally, as illustrated in FIG. 7, the chip 700 may also include a memory 720. The processor 710 can call and run a computer program from memory 720 to execute a method in an embodiment of the present disclosure.

The memory 720 may be a separate device independent of the processor 710 or may be integrated in the processor 710.

Optionally, the chip 700 may also include an input interface 730. The processor 710 may control the input interface 730 to communicate with other devices or chips, and in particular may obtain information or data sent by other devices or chips.

Optionally, the chip 700 may also include an output interface 740. The processor 710 may control the output interface 740 to communicate with other devices or chips, and in particular may output information or data to other devices or chips.

Optionally, the chip may be applied to a network device of the embodiments of the present disclosure, and the chip may implement corresponding processes implemented by the network device in the respective methods of the embodiment of the present disclosure, which will not be repeated here for the sake of brevity.

Optionally, the chip may be applied to a mobile terminal/a terminal device of the embodiments of the present disclosure, and the chip may implement corresponding processes implemented by the mobile terminal/the terminal device in the respective methods of the embodiment of the present disclosure, which will not be repeated here for the sake of brevity.

It should be understood that the chip referred to in embodiments of the present disclosure may also be referred to as system-level chip, system chip, chip system or system-on-chip or the like.

Figure 8:
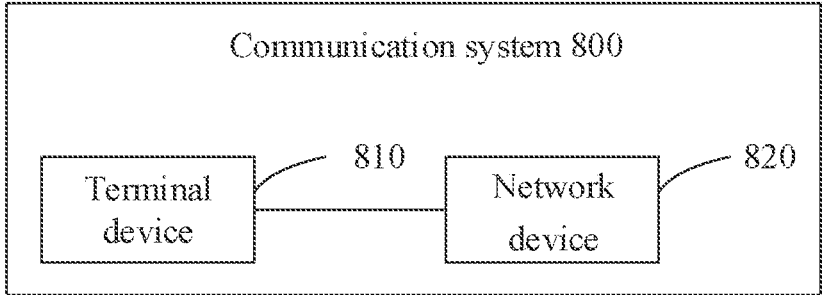
FIG. 8 is a schematic block diagram of a communication system provided by an embodiment of the present disclosure.

FIG. 8 is a schematic block diagram of a communication system 800 provided by an embodiment of the present disclosure. As illustrated in FIG. 8, the communication system 800 includes a terminal device 810 and a network device 820.

The terminal device 810 may be used to implement corresponding functions implemented by the terminal device in the above method, and the network device 820 may be used to implement corresponding functions implemented by the network device in the above method, which will not be repeated here for the sake of brevity.

It should be understood that the processor may be an integrated circuit chip having signal processing capability. In the implementation process, the operations of the above method embodiments may be accomplished by integrated logic circuitry of hardware in processor or instructions in the form of software. The processor may be a general purpose processor, a digital signal processor (DSP), an application specific integrated circuit (ASIC), a field programmable gate array (FPGA) or other programmable logic devices, discrete gates or transistor logic devices, or discrete hardware components. The processor may implement or execute the methods, operations and logic diagrams disclosed in embodiments of the present disclosure. The general purpose processor can be a microprocessor or any conventional processor. The operations of the method disclosed in the embodiment of the disclosure can be directly embodied as the completion of the execution of the hardware decoding processor or the completion of the combined execution of the hardware and software modules in the decoding processor. The software module may be located in RAM, flash memory, read-only memory, programmable read-only memory or electrically erasable programmable memory, registers and other mature storage media in the art. The storage medium is located in the memory, and the processor reads the information in the memory to complete the operations of the aforementioned method in conjunction with its hardware.

It will be appreciated that the memory in embodiments of the present disclosure may be volatile memory or non-volatile memory, or may also include both volatile and non-volatile memory. The non-volatile memory may be read-only memory (ROM), programmable ROM (PROM), erasable PROM (EPROM), electrically EPROM (EPROM) or flash memory. The volatile memory may be random access memory (RAM), which serves as an external cache. By way of illustration but not limitation, many forms of RAM are available, for example, static RAM (SRAM), dynamic RAM (DRAM), synchronous DRAM (SDRAM), double data rate SDRAM (DDR SDRAM), enhanced SDRAM (ESDRAM), synchronous link DRAM (SL-DRAM), direct rambus RAM (DR RAM), etc. It should be noted that the memory of the systems and methods described herein is intended to include but not limited to these and any other suitable types of memory.

It should be understood that the memory described above is exemplary but not limiting, for example, the memory in embodiments of the present disclosure may also be static RAM (SRAM), dynamic RAM (DRAM), synchronous DRAM (SDRAM), double data rate SDRAM (DDR SDRAM), enhanced SDRAM (ESDRAM), synchronous link DRAM (SLDRAM), direct rambus RAM (DR RAM), etc. That is, memory in embodiments of the present disclosure is intended to include but not limited to these and any other suitable types of memory.

In an embodiment of the present disclosure, there is provided a computer-readable storage medium, which is configured to store a computer program.

Optionally, the computer-readable storage medium may be applied to a network device of an embodiment of the present disclosure, and the computer program causes the computer to execute corresponding processes implemented by the network device in the respective methods of the embodiment of the present disclosure, which will not be repeated here for the sake of brevity.

Optionally, the computer-readable storage medium may be applied to be a mobile terminal/a terminal device of an embodiment of the present disclosure, and the computer program causes the computer to implement corresponding processes implemented by the mobile terminal/the terminal device in the respective methods of the embodiment of the present disclosure, which will not be repeated here for the sake of brevity.

In an embodiment of the present disclosure, there is provided a computer program product, which includes computer program instructions.

Optionally, the computer program product may be applied to a network device of an embodiment of the present disclosure, and the computer program instructions cause the computer to execute corresponding processes implemented by the network device in the respective methods of the embodiment of the present disclosure, which will not be repeated here for the sake of brevity.

Optionally, the computer program product may be applied to a mobile terminal/a terminal device of an embodiment of the present disclosure, and the computer program instructions causes the computer to implement corresponding processes implemented by the mobile terminal/the terminal device in the respective methods of the embodiment of the present disclosure, which will not be repeated here for the sake of brevity.

In an embodiment of the present disclosure, there is provided a computer program.

Optionally, the computer program may be applied to a network device of an embodiment of the present disclosure, when run on the computer, the computer program causes the computer to execute corresponding processes implemented by the network device in the respective methods of the embodiment of the present disclosure, which will not be repeated here for the sake of brevity.

Optionally, the computer program may be applied to a mobile terminal/a terminal device of an embodiment of the present disclosure, when run on the computer, the computer program causes the computer to implement corresponding processes implemented by the mobile terminal/the terminal device in the respective methods of the embodiment of the present disclosure, which will not be repeated here for the sake of brevity.

Those skilled in the art will appreciate that the various example units and algorithm steps described in connection with the embodiments disclosed herein can be implemented in electronic hardware or a combination of computer software and electronic hardware. Whether these functions are performed in hardware or software depends on the specific application and design constraints of the technical solution. Professionals can use different methods for each particular application to implement the described functionality but such implementation should not be considered outside the scope of the present disclosure.

Those skilled in the art will clearly appreciate that, for convenience and conciseness of description, the specific operating processes of the above-described systems, apparatuses and units may refer to the corresponding processes in the aforementioned method embodiments and will not be repeated herein.

In several embodiments provided herein, it should be understood that the disclosed systems, apparatuses and methods may be implemented in other ways. For example, the above-described embodiment of the apparatus is only schematic, for example, the division of the unit is only a logical function division, and in practice, there may be another division mode, for example, multiple units or components may be combined or integrated into another system, or some features may be ignored or not performed. Furthermore, the coupling or direct coupling or communication connection between each other illustrated or discussed may be indirect coupling or communication connection through some interface, device or unit, and may be electrical, mechanical or other form.

The units illustrated as separate elements may or may not be physically separated, and the elements displayed as units may or may not be physical units, i.e. may be located in a place, or may be distributed over a plurality of network units. Part or all of the units can be selected according to the actual needs to achieve the purpose of the embodiment.

In addition, each functional unit in each embodiment of the present disclosure may be integrated in a processing unit, each unit may exist physically alone, or two or more units may be integrated in a unit.

The functions may be stored in a computer-readable storage medium if it is implemented in the form of software functional units and sold or used as independent products. Based on such an understanding, the technical solutions according to the disclosure in essence or the part contributing to the prior art or the part of the technical solution can be embodied in the form of a software product, and the computer software product is stored in a storage medium, which includes several instructions so that a computer device (may be a personal computer, a server, a network device or the like) implements all or part of the method according to respective embodiments of the disclosure. The aforementioned storage medium includes various media capable of storing a program code such as a USB disk, a mobile hard drive disk, a read-only memory (ROM), a random access memory (RAM), a magnetic disk or an optical disk.

The above is only the specific implementation of the present disclosure, but the scope of protection of the present disclosure is not limited thereto. Any person skilled in the art can easily think of changes or substitutions within the technical scope disclosed in the disclosure, which should be covered within the protection scope of the disclosure. Therefore, the scope of protection of the disclosure shall be subject to the scope of protection of the claim.

The invention claimed is:

1. A measurement method, comprising:

receiving, by a terminal device, a first measurement configuration from a first network device through radio resource control (RRC) dedicated signaling, wherein the first measurement configuration is a measurement configuration for an idle state or an inactive state; and performing, by the terminal device, a measurement based on the first measurement configuration in the idle state or the inactive state, and reporting, by the terminal device, a measurement result to a second network device after the terminal device enters a connected state, the second network device being different from the first network device;

wherein the first measurement configuration carries second indication information, and the second indication information is used for indicating at least one of a cell on which the terminal device needs to perform a measurement or a cell of which the terminal device needs to report a measurement result;

wherein the first measurement configuration comprises configuration information of at least one frequency point, and the at least one frequency point comprises a first frequency point; and wherein configuration information of the first frequency point comprises synchronization signal block (SSB) configuration information and a second physical cell identification (PCI) list, the second PCI list is used for indicating that the terminal device needs to perform a measurement on a cell corresponding to the second PCI list when performing the measurement on the SSB at the first frequency point;

wherein the at least one frequency point further comprises a second frequency point, configuration information of the second frequency point does not comprise SSB configuration information, and the method further comprises:

acquiring, by the terminal device, SSB configuration information and SSB measurement timing configuration (SMTC) which correspond to the second frequency point from a system broadcast message; and performing, by the terminal device, a measurement on the SSB at the second frequency point based on the SSB configuration information and the SMTC which correspond to the second frequency point.

2. The method of claim 1, wherein in response to that the second frequency point has a first SMTC and a second SMTC in a system broadcast message, the SMTC is configured as the first SMTC, and wherein a period of the second SMTC is longer than a period of the first SMTC.

3. A measurement method, comprising:

sending, by a first network device, a first measurement configuration to a terminal device through radio resource control (RRC) dedicated signaling, wherein the first measurement configuration is a measurement configuration for an idle state or an inactive state; wherein the first measurement configuration carries at least one of first indication information or second indication information, and the second indication information is used for indicating at least one of a cell on which the terminal device needs to perform a measurement or a cell of which the terminal device needs to report a measurement result;

wherein the first measurement configuration is used for the terminal device to perform a measurement in the idle state or the inactive state and report a measurement result to a second network device after the terminal device enters a connected state, the second network device being different from the first network device;

wherein the first measurement configuration comprises configuration information of at least one frequency point, and the at least one frequency point comprises a first frequency point; and wherein configuration information of the first frequency point comprises synchronization signal block (SSB) configuration information and a second physical cell identification (PCI) list, the second PCI list is used for indicating that the terminal device needs to perform a measurement on a cell corresponding to the second PCI list when performing the measurement on the SSB at the first frequency point;

wherein the at least one frequency point further comprises a second frequency point, configuration information of the second frequency point does not comprise SSB configuration information, and SSB configuration information and SSB measurement timing configuration (SMTC) which correspond to the second frequency point are acquired from a system broadcast message.

4. A measurement apparatus, applied to a terminal device and comprising a processor and a memory, wherein the memory is configured to store a computer program, and the processor is configured to call and run the computer program stored in the memory to:

receive a first measurement configuration from a first network device through radio resource control (RRC) dedicated signaling, wherein the first measurement configuration is a measurement configuration for an idle state or an inactive state; and wherein the first measurement configuration carries second indication information, and the second indication information is used for indicating at least one of a cell on which the terminal device needs to perform a measurement or a cell of which the terminal device needs to report a measurement result; and perform a measurement based on the first measurement configuration in the idle state or the inactive state, and report a measurement result to a second network device after the terminal device enters a connected state, the second network device being different from the first network device;

wherein the first measurement configuration comprises configuration information of at least one frequency point, and the at least one frequency point comprises a first frequency point; and wherein configuration information of the first frequency point comprises synchronization signal block (SSB) configuration information and a second physical cell identification (PCI) list, the second PCI list is used for indicating that the terminal device needs to perform a measurement on a cell corresponding to the second PCI list when performing the measurement on the SSB at the first frequency point;

wherein the at least one frequency point further comprises a second frequency point, configuration information of the second frequency point does not comprise SSB configuration information, and the processor is further configured to:

acquire SSB configuration information and SSB measurement timing configuration (SMTC) which correspond to the second frequency point from a system broadcast message; and perform a measurement on the SSB at the second frequency point based on the SSB configuration information and the SMTC which correspond to the second frequency point.

5. The apparatus of claim 4, wherein, in response to that the second frequency point has a first SMTC and a second SMTC in a system broadcast message, the SMTC is configured as the first SMTC, and wherein a period of the second SMTC is longer than a period of the first SMTC.

6. A measurement apparatus, applied to a first network device and comprising a processor and a memory, wherein the memory is configured to store a computer program, and the processor is configured to call and run the computer program stored in the memory to:

send a first measurement configuration to a terminal device through radio resource control (RRC) dedicated signaling, wherein the first measurement configuration is a measurement configuration for an idle state or an inactive state; wherein the first measurement configuration carries second indication information, and the second indication information is used for indicating at least one of a cell on which the terminal device needs to perform a measurement or a cell of which the terminal device needs to report a measurement result;

wherein the first measurement configuration is used for the terminal device to perform a measurement in the idle state or the inactive state and report a measurement result to a second network equipment after the terminal device enters a connected state, the second network device being different from the first network device;

wherein the first measurement configuration comprises configuration information of at least one frequency point, and the at least one frequency point comprises a first frequency point; and wherein configuration information of the first frequency point comprises synchronization signal block (SSB) configuration information and a second physical cell identification (PCI) list, the second PCI list is used for indicating that the terminal device needs to perform a measurement on a cell corresponding to the second PCI list when performing the measurement on the SSB at the first frequency point;

wherein the at least one frequency point further comprises a second frequency point, configuration information of the second frequency point does not comprise SSB configuration information, and SSB configuration information and SSB measurement timing configuration (SMTC) which correspond to the second frequency point are acquired from a system broadcast message.

7. A chip, comprising a processor, configured to call and run a computer program in a memory to cause a device equipped with the chip to execute the method of claim 1.

8. A chip, comprising a processor, configured to call and run a computer program in a memory to cause a device equipped with the chip to execute the method of claim 3.

9. A non-transitory computer-readable storage medium, configured to store a computer program that causes a computer to execute the method of claim 1.

10. A non-transitory computer-readable storage medium, configured to store a computer program that causes a computer to execute the method of claim 3.

11. The method of claim 1, wherein the first measurement configuration further carries first indication information, the first indication information is used for indicating at least one of a cell on which the terminal device does not need to perform a measurement or a cell of which the terminal device does not need to report a measurement result, and the first indication information is implemented through a first PCI list.

12. The method of claim 11, wherein in response to that the first frequency point has a first SMTC and a second SMTC in a system broadcast message, the first PCI list in the SSB configuration information of the first frequency point is a PCI list configured in the second SMTC, and wherein a period of the second SMTC is longer than a period of the first SMTC.

13. The method of claim 1, wherein in response to that the first frequency point has a first SMTC and a second SMTC in a system broadcast message, a PCI list configured in the second SMTC is used for indicating at least one of: that the terminal device does not need to perform a measurement on a cell corresponding to the PCI list when performing the measurement on the SSB at the first frequency point, or that the terminal device does not need to report a measurement result of a cell corresponding to the PCI list when performing the measurement on the SSB at the first frequency point, and wherein a period of the second SMTC is longer than a period of the first SMTC.

14. The method of claim 3, wherein the first measurement configuration further carries first indication information, the first indication information is used for indicating at least one of a cell on which the terminal device does not need to perform a measurement or a cell of which the terminal device does not need to report a measurement result, and the first indication information is implemented through a first PCI list.

15. The method of claim 14, wherein in response to that the first frequency point has a first SMTC and a second SMTC in a system broadcast message, the first PCI list in the SSB configuration information of the first frequency point is a PCI list configured in the second SMTC, and wherein a period of the second SMTC is longer than a period of the first SMTC.

16. The apparatus of claim 4, wherein the first measurement configuration further carries first indication information, the first indication information is used for indicating at least one of a cell on which the terminal device does not need to perform a measurement or a cell of which the terminal device does not need to report a measurement result, and the first indication information is implemented through a first PCI list.

17. The apparatus of claim 16, wherein, in response to that the first frequency point has a first SMTC and a second SMTC in a system broadcast message, the first PCI list in the SSB configuration information of the first frequency point is a PCI list configured in the second SMTC, and wherein a period of the second SMTC is longer than a period of the first SMTC.

18. The apparatus of claim 4, wherein in response to that the first frequency point has a first SMTC and a second SMTC in a system broadcast message, a PCI list configured in the second SMTC is used for indicating at least one of: that the terminal device does not need to perform a measurement on a cell corresponding to the PCI list when performing the measurement on the SSB at the first frequency point, or that the terminal device does not need to report a measurement result of a cell corresponding to the PCI list when performing the measurement on the SSB at the first frequency point, and wherein a period of the second SMTC is longer than a period of the first SMTC.

19. The apparatus of claim 6, wherein the first measurement configuration further carries first indication information, the first indication information is used for indicating at least one of a cell on which the terminal device does not need to perform a measurement or a cell of which the terminal device does not need to report a measurement result, and the first indication information is implemented through a first PCI list.

20. The apparatus of claim 19, wherein in response to that the first frequency point has a first SMTC and a second SMTC in a system broadcast message, the first PCI list in the SSB configuration information of the first frequency point is a PCI list configured in the second SMTC, and wherein a period of the second SMTC is longer than a period of the first SMTC.

* * * * *